(12) United States Patent
Fujisawa et al.

(10) Patent No.: US 9,806,571 B2
(45) Date of Patent: Oct. 31, 2017

(54) COMPOSITE TORQUE ROTATING ELECTRIC MACHINE

(75) Inventors: Yukinari Fujisawa, Tokyo (JP); Masataka Yahara, Tokyo (JP); Hiroshi Nagase, Sagamihara (JP); Fumio Tajima, Sagamihara (JP); Yoshihiro Yamaguchi, Sagamihara (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 293 days.

(21) Appl. No.: 14/404,551

(22) PCT Filed: May 28, 2012

(86) PCT No.: PCT/JP2012/063673
§ 371 (c)(1),
(2), (4) Date: Nov. 28, 2014

(87) PCT Pub. No.: WO2013/179376
PCT Pub. Date: Dec. 5, 2013

(65) Prior Publication Data
US 2015/0108865 A1    Apr. 23, 2015

(51) Int. Cl.
*H02K 1/27*    (2006.01)

(52) U.S. Cl.
CPC ......... *H02K 1/2773* (2013.01); *H02K 1/2766* (2013.01)

(58) Field of Classification Search
CPC .......................... H02K 1/2773; H02K 1/2766
(Continued)

(56) References Cited

U.S. PATENT DOCUMENTS

| 6,483,212 B1 | 11/2002 | Mimura et al. |
| 2002/0175585 A1 | 11/2002 | Tagome et al. |

(Continued)

FOREIGN PATENT DOCUMENTS

| JP | 2001-145283 A | 5/2001 |
| JP | 2001-178092 A | 6/2001 |

(Continued)

OTHER PUBLICATIONS

International Search Report PCT/JP2012/063673 dated Jul. 24, 2012.

*Primary Examiner* — Quyen Leung
*Assistant Examiner* — Eric Johnson
(74) *Attorney, Agent, or Firm* — McDermott Will & Emery LLP

(57) ABSTRACT

A composite torque rotating electric machine includes a stator having armature windings arranged at multiple positions in a circumferential direction, a rotor having a cylindrical core, first permanent magnets arranged on axes (d) and in the circumferential direction on the outer periphery of the rotor, second permanent magnets arranged on axes (d) on the inner periphery side of the rotor across from the permanent magnets on the outer circumference side, third permanent magnets on axes (q) and extending in the longitudinally and radially of the rotor, and air gaps on the outer periphery side of the third permanent magnets and intermediate in the circumferential direction of the first permanent magnets. The radial distance between the first and second magnets is greater than the circumferential distance between the first permanent magnets and the air gaps. A rectifier having multiple slits is disposed between the first permanent magnets and the air gaps.

8 Claims, 8 Drawing Sheets

(58) Field of Classification Search
USPC .................. 310/156.07, 156.53–156.54,
310/156.56–156.57
See application file for complete search history.

(56) References Cited

U.S. PATENT DOCUMENTS

| | | | | |
|---|---|---|---|---|
| 2006/0103335 A1* | 5/2006 | Kolehmainen | ........ | H02K 1/278 318/81 |
| 2007/0126304 A1* | 6/2007 | Ito | ........ | H02K 1/2766 310/156.53 |
| 2012/0267977 A1* | 10/2012 | Merwerth | ........ | H02K 1/2766 310/156.53 |

FOREIGN PATENT DOCUMENTS

| | | | | |
|---|---|---|---|---|
| JP | 3290392 B2 | 6/2002 | | |
| JP | 2003-18777 A | 1/2003 | | |
| JP | 3970392 B2 | 9/2007 | | |
| WO | WO 2011051153 A2 * | 5/2011 | ........ | H02K 1/2766 |

* cited by examiner

CASE 1

CASE 2

CASE 3

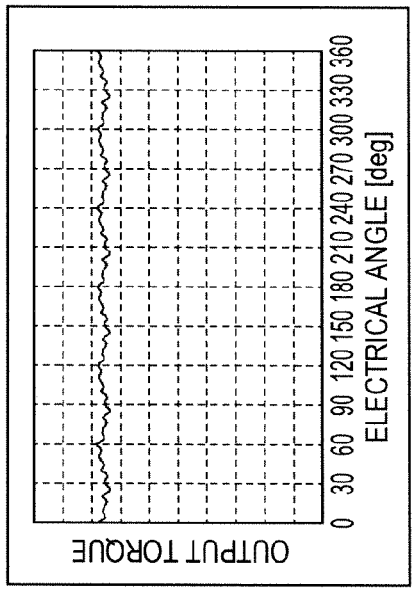
FIG. 11A
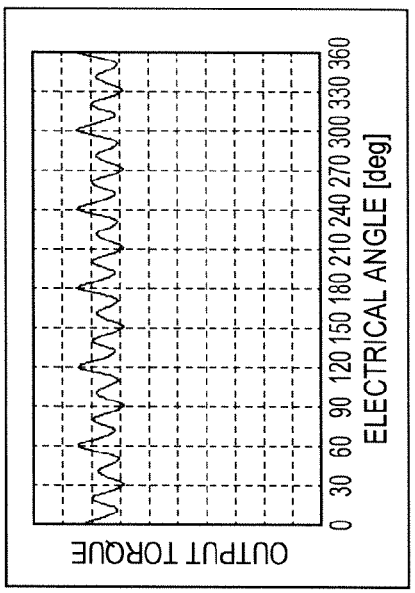
FIG. 11B
CASE 1
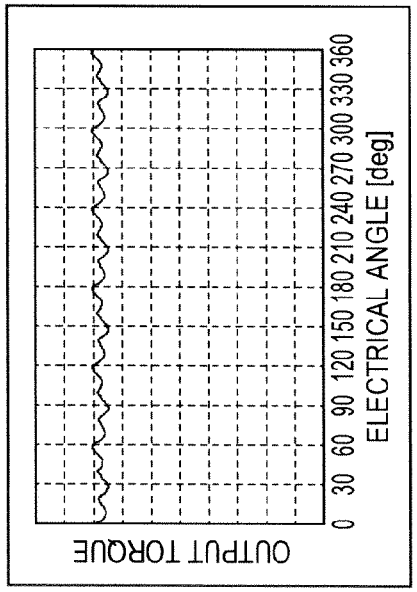
FIG. 11D
CASE 3
FIG. 11C
CASE 2 ies to the d-axis is referred to as a q-axis. As a conventional structure, an example in which plural permanent magnets are buried in the d-axis has been known (for example, see Patent Literature 1). Further, as a permanent magnet-type rotating electric machine combined with reluctance torque, Patent Literature 2 has been known. Further, Patent Literature 3 shows a rotor of a permanent magnet-type rotating machine whose configuration is simplified by reducing the number of permanent magnets while obtaining high reluctance torque.

COMPOSITE TORQUE ROTATING ELECTRIC MACHINE

CROSS-REFERENCE TO RELATED APPLICATIONS

This Application is the U.S. National Phase of PCT/JP2012/063673 filed May 28, 2012, the subject matter of which is incorporated herein by reference in entirety.

TECHNICAL FIELD

The present invention relates to a composite torque rotating electric machine using permanent magnets having a low residual magnetic flux density such as ferrite magnets.

BACKGROUND ART

In a synchronous motor in which permanent magnets are buried in a rotor, the magnetic pole central axis of each permanent magnet is referred to as a d-axis, and an axis that is electrically and magnetically orthogonal to the d-axis is referred to as a q-axis. As a conventional structure, an example in which plural permanent magnets are buried in the d-axis has been known (for example, see Patent Literature 1). Further, as a permanent magnet-type rotating electric machine combined with reluctance torque, Patent Literature 2 has been known. Further, Patent Literature 3 shows a rotor of a permanent magnet-type rotating machine whose configuration is simplified by reducing the number of permanent magnets while obtaining high reluctance torque.

CITATION LIST

Patent Literature

Patent Literature 1: Japanese Patent No. 3290392
Patent Literature 2: Japanese Patent No. 3970392
Patent Literature 3: Japanese Patent Application Laid-Open No. 2001-145283

SUMMARY OF INVENTION

Technical Problem

A composite torque rotating electric machine realizes high torque by combining reluctance torque of armature magnetic flux generated at armature windings of a stator with magnet torque of magnet magnetic flux of permanent magnets.

In a conventional structure shown in Patent Literature 1, plural permanent magnets are buried in the d-axis direction. However, due to the structure in which the permanent magnets are buried, iron cores are present across the entire outer periphery of a rotor corresponding to the outer periphery side of the permanent magnets, and the spatial harmonic of closed loop armature magnetic flux generated at armature windings of a stator easily flows in the iron core portions. The closed loop spatial harmonic hardly contributes to the reluctance torque. However, when the closed loop spatial harmonic passes through the iron cores of the stator and the rotor, the magnetic saturation trend of the iron cores is enhanced. As a result, the effective amount of magnetic flux that contributes to the reluctance torque has not been sufficiently obtained.

Further, in order to further enhance the reluctance effect, sections between the permanent magnets are largely opened so that the magnetic flux can easily flow in from the one q-axis direction (Patent Literature 1 and FIG. 2). Then, the magnetic flux flowing in from the one q-axis direction passes through the inner periphery side of the permanent magnets buried on the inner periphery side on the d-axis, and flows out from the other q-axis direction. However, a magnetic path of the route becomes long, and thus the magnetoresistance is increased. Accordingly, a magnetic loss is disadvantageously increased.

Further, due to the necessity of spaces by largely opening the sections between the permanent magnets in the iron core portions in the q-axis direction, it is difficult to form plural poles because of restrictions on the dimension and arrangement of the permanent magnets. Thus, the size of the rotor needs to be increased for plural poles. Further, because the sections between the permanent magnets in the iron core portions in the q-axis direction are largely opened, the dimension of each of the plural permanent magnets in the d-axis needs to be reduced, and the magnet torque cannot be sufficiently obtained.

The conventional structure of Patent Literature 2 is a representative structure as a structure of the permanent magnet-type rotating electric machine combined with the reluctance torque. The reluctance torque in the structure is generated at the iron core portions on the outer periphery side relative to the permanent magnets. In order to ease the magnetic saturation in the iron core portions, the permanent magnets are arranged nearer the inner periphery side to increase the dimension of the iron core portions. In this case, the length of each permanent magnet in the circumferential direction of the rotor is shortened, and the magnet torque is reduced.

In the rotating electric machine using the permanent magnets, neodymium magnets are used particularly for the permanent magnets positioned on the outer periphery side of the rotor in order to avoid an increase in magnet torque and permanent demagnetization. However, it is very difficult to obtain neodymium and dysprosium of rare-earth metal, and they are very expensive. On the other hand, ferrite magnets can be easily obtained, and are inexpensive. However, the magnet torque is small due to a low magnetic force, and further the permanent demagnetization easily occurs due to a low retaining force.

Patent Literature 3 shows a rotor of a permanent magnet-type rotating machine whose configuration is simplified by reducing the number of permanent magnets while obtaining high reluctance torque. However, the magnetic path of the magnetic flux from the stator passes through between one end of the longitudinal direction of the permanent magnet positioned on the outer periphery side and the permanent magnet positioned in the radial direction, and runs through between the other end of the longitudinal direction of the permanent magnet and the adjacent permanent magnet through the inside of a trapezoidal shape. As described above, the magnetic flux from the stator takes a shortcut in the inside of the trapezoidal shape. Therefore, the magnetic flux is likely to be saturated at the iron core portions in the inside of the trapezoidal shape, and the magnetoresistance is increased.

The present invention has been achieved in view of the above-described problems, and armature magnetic flux generated from armature windings of a stator is rectified using rectifying units of plural slits to realize high torque of a composite torque rotating electric machine using permanent magnets having a low residual magnetic flux density such as ferrite magnets.

Solution to Problem

In order to achieve the above-described object, the present invention provides a composite torque rotating electric machine including: a stator in which armature windings are arranged at plural areas in the circumferential direction at regular intervals; a rotor that is configured using a cylindrical iron core obtained by laminating magnetic steel sheets; plural first permanent magnets that are provided on d-axes and that are arranged in the circumferential direction on the outer periphery of the rotor; plural second permanent magnets that are provided on the d-axes and that are arranged on the inner periphery side of the rotor to face the permanent magnets on the outer periphery side; third permanent magnets that are provided on q-axes and that are radially stretched in the longitudinal direction in the rotor; and air gap portions that are provided in the middle of the circumferential direction of the plural first permanent magnets on the outer periphery side of the third permanent magnets, wherein the distances in the radial direction between the first permanent magnets and the second permanent magnets are larger than those in the circumferential direction between the first permanent magnets and the air gap portions, and rectifying units configured using plural slits are provided between the first permanent magnets and the air gap portions.

Further, in the above-described composite torque rotating electric machine, the intervals between the plural slits are longer on the inner periphery side than those on the outer periphery side.

Further, in the above-described composite torque rotating electric machine, a first slit of the plural slits near the first permanent magnet is parallel to the q-axis, and a second slit nearest to the q-axis is parallel to the d-axis.

Further, in the above-described composite torque rotating electric machine, slits provided between the first slit and the second slit are divided at an intersection point as the center between the central axis of the first slit and the central axis of the second slit.

Further, in the above-described composite torque rotating electric machine, slits provided between the first slit and the second slit are divided into equal angles at an intersection point as the center between the central axis of the first slit and the central axis of the second slit.

Further, in the above-described composite torque rotating electric machine, non-magnetic bodies are enclosed in the inside of the plural slits.

Advantageous Effects of Invention

According to the present invention, high composite torque of reluctance torque of armature magnetic flux and magnet torque of permanent magnets can be realized in a permanent magnet rotating electric machine using permanent magnets having a low residual magnetic flux density such as ferrite magnets.

BRIEF DESCRIPTION OF DRAWINGS

FIG. 11 are diagrams for showing results by the electromagnetic analysis.

DESCRIPTION OF EMBODIMENTS

Figure 1:
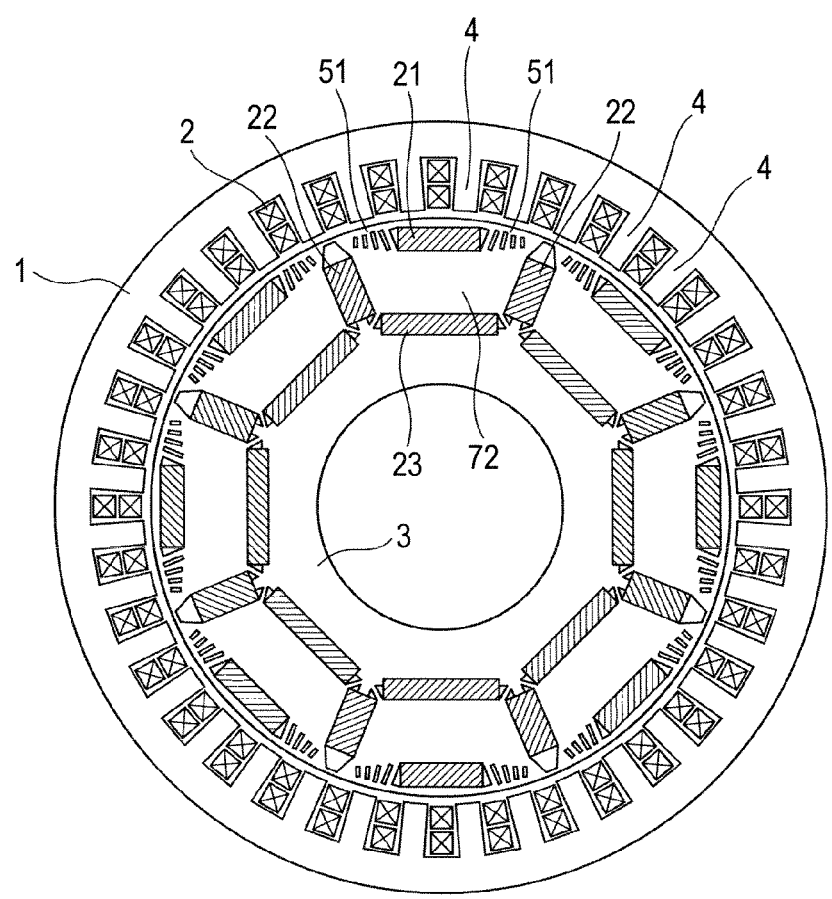
FIG. 1 is a cross-sectional view of a composite torque rotating electric machine in the radial direction according to a first embodiment of the present invention.

In embodiments of the present invention, the respective effects obtained from the following configurations (a) to (f) are considered.

(a) Permanent magnets to serve as magnetic flux blocking units that block the inflow and outflow of armature magnetic flux generated at armature windings arranged at teeth of a stator are arranged on the outer periphery side on d-axes of a rotor.

(b) Permanent magnets having a rectangular shape to prevent short circuit of magnetic flux between adjacent magnetic poles and to serve as rectification of a magnetic path are arranged on the inner periphery side.

(c) Permanent magnets serving to prevent short-circuit magnetic flux with adjacent magnetic poles are arranged on q-axes of the rotor.

(d) An air gap having a trapezoidal shape in which the inner periphery side corresponds to a long side and the outer periphery side corresponds to a short side is arranged at an end on the outer periphery side of each of the permanent magnets.

(e) The interval between each permanent magnet positioned on the outer periphery side on the d-axis of the rotor and each permanent magnet on the q-axis and each air gap having a trapezoidal shape is provided wider so that magnetic flux from the stator easily flows in the rotor.

(f) Rectifying units configured using plural slits are formed at an iron core in an area where the interval is wide.

By employing each of the above-described configurations as necessary, a rotating electric machine with high torque can be obtained. For example, permanent magnets are arranged so as to surround the edges of magnetic poles using the permanent magnets in the rotor, and thus more magnet magnetic flux can be obtained. Accordingly, magnet torque can be maximally used.

Further, the spatial harmonic of armature magnetic flux can be blocked in the entire circumferential area on the outer periphery side of the iron core in the rotor using each permanent magnet positioned on the outer periphery side on the d-axis of the rotor, each air gap having a trapezoidal shape positioned on the outer periphery side on the q-axis, and plural slits formed therebetween, and the magnetic saturation trend in the stator and the rotor can be suppressed. Thus, the amount of magnetic flux effective for torque can be amplified, and high torque can be realized.

Further, in the case where high torque is realized using permanent magnets having a low residual magnetic flux density such as ferrite magnets, it is necessary to use more reluctance torque. In the case of a reluctance-type rotating electric machine, a magnetic density difference is enlarged between the d-axis direction and the q-axis direction, so that the reluctance torque can be increased. However, the torque pulsation per one cycle is generally increased by the magnetic density difference.

In the embodiments, the magnetic flux can be rectified by the slit groups. Thus, the reluctance torque can be increased, and at the same time, the torque pulsation can be suppressed. Further, the air gaps positioned at ends on the outer periphery side of the permanent magnets on the q-axis are formed in a trapezoidal shape, so that the magnetic flux flowing in from the teeth of the stator can be rectified, and thus the same effect as the above-described slit groups can be obtained.

Further, the magnetic flux passes through the iron core portion having a large area surrounded by the permanent magnets positioned on the outer periphery side and the inner periphery side on the d-axis and the permanent magnets positioned on the q-axis. Thus, the magnetoresistance can be reduced, a magnetic path of the magnetic flux can be shortened, and a magnetic loss can be decreased. Further, if the magnetic flux passes through the iron core portion, the restrictions on the arrangement of the permanent magnets along the q-axis and the thickness in the circumferential direction can be eased. Thus, plural poles can be easily formed.

Hereinafter, a detailed structure of each embodiment of the present invention will be described using the drawings. It should be noted that a permanent magnet has a low residual magnetic flux density in the description of each embodiment unless otherwise described. Specifically, the permanent magnet denotes a magnet referred to as a ferrite magnet.

First Embodiment

Figure 2:
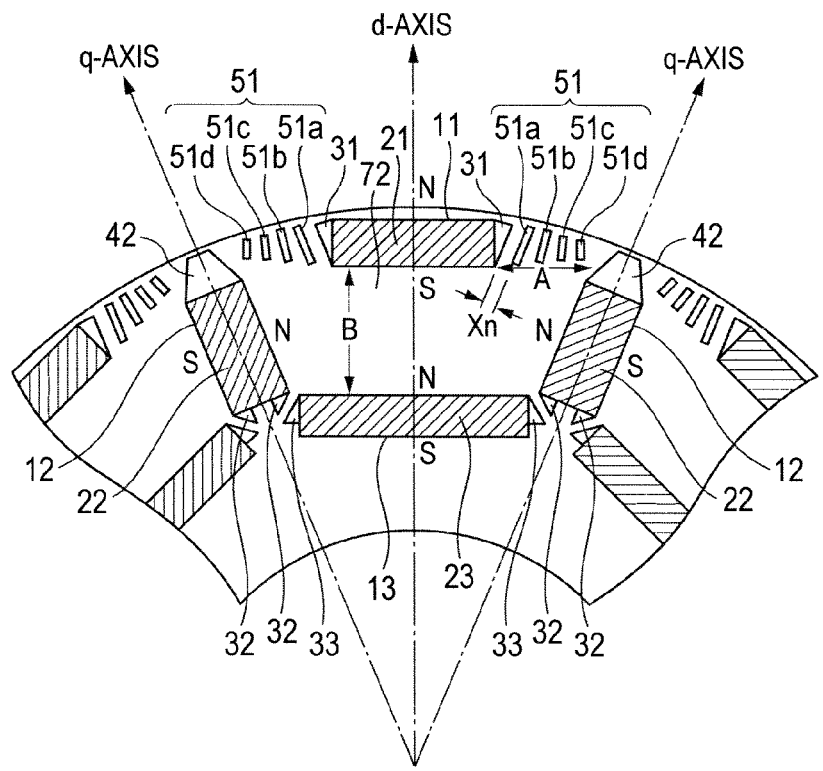
FIG. 2 is an enlarged view of main parts of a rotor structure according to the first embodiment of the present invention.

First, a structure of a first embodiment will be described using FIG. 1 to FIG. 2. FIG. 1 is a cross-sectional view of a composite torque rotating electric machine in the radial direction, and FIG. 2 is an enlarged view of main parts of a rotor structure. It should be noted that a d-axis (magnetic pole central axis of permanent magnets) and a q-axis that is electromagnetically orthogonal to the d-axis are represented by dashed-dotted lines in FIG. 2.

The composite torque rotating electric machine of the embodiment is configured using a stator 1 having octal armature windings, and a cylindrical rotor 3. The iron core of the rotor 3 is configured using laminated circular magnetic steel sheets, and permanent magnets composed of three or more ferrite magnets are buried in one magnetic pole. Plural teeth 4 are formed in the stator 1 across the inner circumferential direction, and armature windings 2 are wound and arranged around the respective teeth 4.

A structure of the rotor 3 will be described using FIG. 2. Permanent magnets 21 (first permanent magnets 21) in each of which the circumferential direction corresponds to the longitudinal direction are arranged on the outer periphery side of the rotor 3. Each of the permanent magnets 21 on the outer periphery side is buried in a permanent magnet insertion air gap portion 11 having nearly a rectangular shape formed on the outer periphery side on the d-axis, and is fixed by adhesive material or rubber made of resin. Each of the permanent magnets 21 is magnetized in the direction parallel to the d-axis. Further, the permanent magnet insertion air gap portion 11 is formed longer in the circumferential direction than each permanent magnet 21, and air gaps 31 having nearly a triangular shape or nearly a trapezoidal shape are formed at both ends of each permanent magnet 21.

Further, permanent magnets 22 (third permanent magnets) are arranged in the rotor 3 so as to be stretched along the q-axes. Each of the permanent magnets 22 is buried in a permanent magnet insertion air gap portion 12 having nearly a rectangular shape formed on the q-axis, and is fixed by adhesive material or rubber made of resin. Each of the permanent magnets 22 is magnetized in the direction orthogonal to the q-axis. In the case where the surface on the outer periphery side of each permanent magnet 21 corresponds to the north pole, each of the permanent magnets 22 is arranged in such a manner that the surface facing the d-axis in which the permanent magnet 21 is buried corresponds to the north pole. On the contrary, in the case where the surface on the outer periphery side of each permanent magnet 21 corresponds to the south pole, each of the permanent magnets 22 is arranged in such a manner that the surface facing the d-axis in which the permanent magnet 21 is buried corresponds to the south pole. An air gap 42 having a trapezoidal shape is formed at an end on the outer periphery side of each permanent magnet 22, and air gaps 32 having a triangular shape or a trapezoidal shape are formed at an end on the inner periphery side.

Further, permanent magnets 23 (second permanent magnets) in each of which the circumferential direction corresponds to the longitudinal direction are arranged in the rotor 3 on the inner periphery side relative to the permanent magnets 21. Each of the permanent magnets 23 on the inner periphery side is buried in a permanent magnet insertion air gap portion 13 having a rectangular shape formed on the inner periphery side on the d-axis, and is fixed by adhesive material or rubber made of resin. Each of the permanent magnets 23 is magnetized in the direction parallel to the d-axis. In the case where the surface on the outer periphery side of each permanent magnet 21 corresponds to the north pole, each of the permanent magnets 23 is arranged in such a manner that the surface on the outer periphery side corresponds to the north pole. In the case where the surface on the outer periphery side of each permanent magnet 21 corresponds to the south pole, each of the permanent magnets 23 is arranged in such a manner that the surface on the outer periphery side corresponds to the south pole.

With the above-described arrangement, the permanent magnets 21 to 23 are arranged to be positioned on the respective sides of a trapezoid on the rotor 3. An interval A between the permanent magnet 21 positioned on the outer periphery side on the d-axis of the rotor and the permanent magnet 22 and the air gap 42 having a trapezoidal shape on the q-axis is set at a length where armature magnetic flux from the stator easily flows in. When the distance between the permanent magnets 21 and 23 is B, the distance B is set larger than the distance A, and the armature magnetic flux from the stator 1 can easily flow in. It should be noted that A denotes a distance in the circumferential direction between the first permanent magnet and the air gap portion, and B denotes a distance in the radial direction between the first permanent magnet and the second permanent magnet.

It should be noted that an example of the magnetization direction of each of the permanent magnets 21 to 23 is illustrated in FIG. 2. Specifically, the permanent magnets 21 and the permanent magnets 23 are magnetized in such a manner that each outer periphery side corresponds to the north pole and each inner periphery side corresponds to the south pole in the embodiment, and the permanent magnets 22 are magnetized in such a manner that the north poles face each other.

A slit group (slit portion) 51 is configured using plural slits 51a to 51d at an iron core portion between the air gap 42 having a trapezoidal shape positioned on the outer periphery side of each permanent magnet 22 and each permanent magnet 21. Four slits are shown in the embodiment, but the number thereof is not limited to four. The air gaps 42 having a trapezoidal shape and the slit groups 51 are non-magnetic bodies (non-magnetic body portions), and configure magnetic flux blocking units together with the permanent magnets 21.

Each of the slit groups 51 is arranged on the outer periphery side of the rotor 3. More preferably, each of the slit groups 51 is formed on the outer periphery side relative to a straight line connecting a corner on the inner periphery side of each permanent magnet 21 to the center of a side on the outer periphery side of each air gap 42 having a trapezoidal shape. Each of the slits 51a to 51d configuring the slit groups 51 is thin in width in the circumferential direction of the rotor 3, and is formed in an elongated shape stretching in the radial direction. Plural slit groups are provided in the circumferential direction at intervals. These slits 51a to 51d may be arranged parallel to each other. Preferably, these slits 51a to 51d are radially arranged in such a manner that the intervals between the slits are narrower on the outer periphery side and are wider on the inner periphery side.

Figure 3:
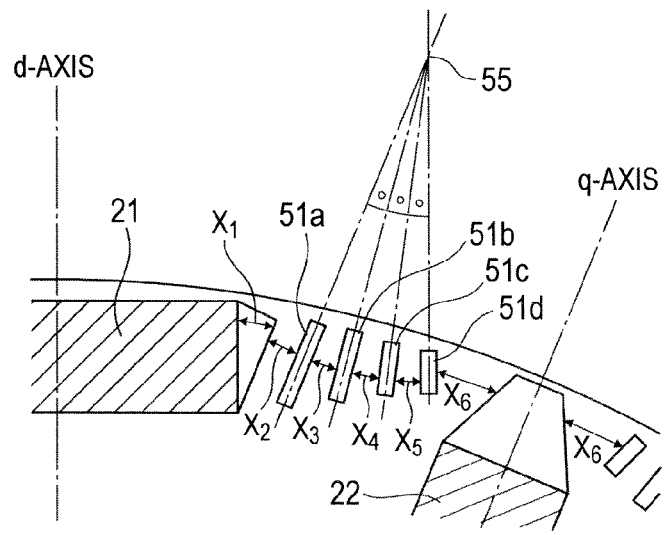
FIG. 3 is an explanatory diagram of arrangement of slits.

More preferably, the slit group 51 is radially arranged as shown in FIG. 3. Specifically, the first slit 51a nearest to the permanent magnet 21 is formed to be parallel to the q-axis, and the second slit 51d nearest to the q-axis is formed to be parallel to the d-axis. The first and second slits 51b and 51c are radially arranged in such a manner that an angle having an intersection point 55 as the center between the central axis of the first slit 51a and the central axis of the second slit 51d is divided into nearly equal angles.

Further, the lengths of the respective slits are shortened at a constant rate from the d-axis side toward the q-axis side. Specifically, the slit 51a is the longest slit, and the slit 51d is the shortest slit. The slits 51b and 51c therebetween are formed shorter in order. The slit group 51 is formed nearly in the middle in the circumferential direction between each permanent magnet 21 and each air gap 42 having a trapezoidal shape. Non-magnetic bodies such as air and resin are enclosed in the inside of each slit, and the enclosure of the non-magnetic bodies can enhance the strength of the iron core.

With the above-described structure employed, the following effects can be expected. The first effect is obtained by the structure at the outer periphery portion of the rotor 3. In the embodiment, the permanent magnets 21 are arranged on the outer periphery side of the rotor, and the air gaps 31 are provided at both ends in the longitudinal direction of each permanent magnet 21. In addition, the slit groups 51 are present adjacent to the air gaps 31, and further the air gaps 42 are present adjacent to the slit groups 51. Next, the slit group 51, the air gap 31, and the permanent magnet 21 are repeatedly present across the entire circumferential direction. Therefore, it is possible to obtain an effect in which closed loop spatial harmonics (magnetic flux) generated at the teeth 4 around the stator windings 2 can be blocked by the structure at the outer periphery portion of the rotor 3.

The second effect is obtained as a rectifying unit (guiding unit) by the slit group 51 for the armature magnetic flux generated by the stator windings 2. Specifically, the slits are radially arranged in such a manner that the intervals between the slits are narrower on the outer periphery side and are wider on the inner periphery side. Accordingly, when the magnetic flux passes through each slit group 51, the magnetic flux is rectified and guided to be radially expanded. Then, the magnetic flux flows while being entirely diffused in an iron core portion 72 having a large area sandwiched between each permanent magnet 21 and each permanent magnet 23. Further, the slit 51a is formed to be the longest slit. Thus, the magnetic flux passing through the iron cores on the both sides of the slit is guided farther in the direction along the slit 51a. Accordingly, the magnetic flux is guided so as to be entirely diffused without shortcut in the iron core portion 72.

Hereinafter, these two effects will be described using the drawings.

Figure 4:
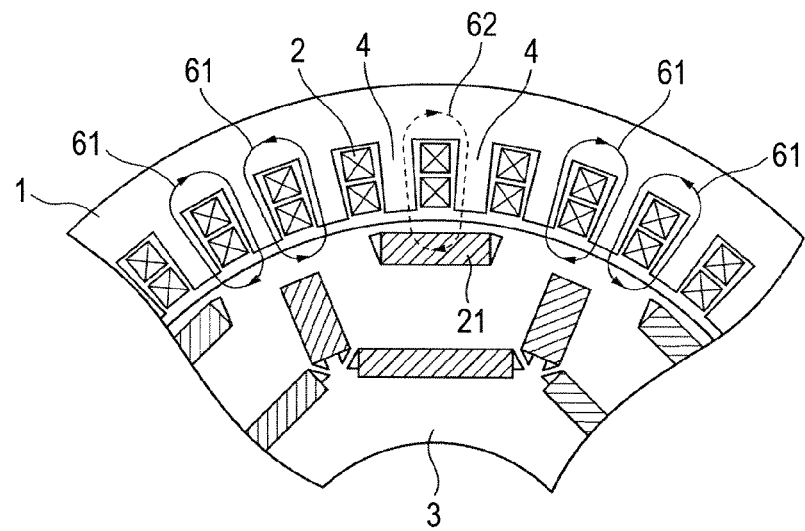
FIG. 4 is a conceptual diagram of spatial harmonics of armature magnetic flux.

FIG. 4 shows a conceptual diagram of the spatial harmonics of the armature magnetic flux. When current is applied to the armature windings 2, the closed loop armature magnetic flux is generated around the armature windings 2. The armature magnetic flux includes magnetic flux forming a closed loop of one slot that flows in the rotor 3 from one teeth of the stator 1 and that flows in from the other nearest teeth. The magnetic flux is the spatial harmonic 61 of the armature magnetic flux, and is different in cycle from the output torque. Thus, the spatial harmonic 61 does not contribute to the output torque. However, the magnetic flux is present in the iron core, and thus the magnetic saturation trend in the iron core portions of the stator 1 and the rotor 3 is enhanced. Specifically, the spatial harmonic 61 does not contribute to the rotation of the electric machine at all, but causes the magnetic saturation. Thus, the effective amount of magnetic flux contributing to the torque cannot be sufficiently obtained, and it is necessary to suppress the spatial harmonic.

FIG. 4 does not show the structure of the embodiment, but shows a state in which the spatial harmonics 61 (shown by arrows of solid lines in the drawing) of the armature magnetic flux are generated at plural areas. Further, the spatial harmonic (shown by an arrow 62 of a dotted line in the drawing) generated around the armature windings 2 positioned in the middle of FIG. 4 is blocked by the permanent magnet 21.

Figure 5:
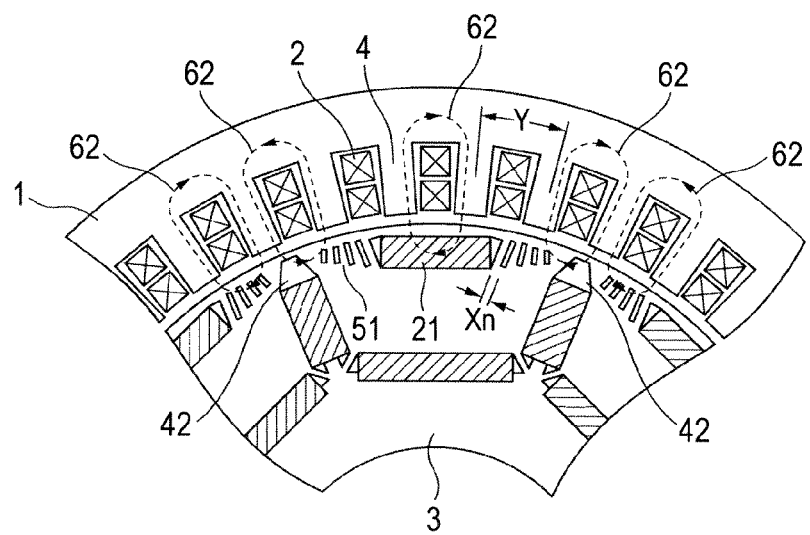
FIG. 5 is a conceptual diagram of the flow of the spatial harmonics in the embodiment of the present invention.

FIG. 5 shows a conceptual diagram of the flow of the spatial harmonic in the embodiment. The spatial harmonic of the armature magnetic flux easily passes through a magnetic body such as an iron core. However, if a non-magnetic body such as air or resin is provided on a magnetic path through which the spatial harmonic passes, the spatial harmonic is blocked by the non-magnetic body. In the embodiment, the spatial harmonic is blocked by arranging the permanent magnets 21, the slit groups 51, and the air gaps 42 having a trapezoidal shape on the outer periphery side of the rotor.

Further, the spatial harmonic configures a closed loop at the adjacent teeth as described above. Therefore, the intervals between the permanent magnets 21 and the air gaps 42 having a trapezoidal shape, the intervals between the permanent magnets 21 and the slit groups 51, the intervals between the slit groups 51 and the air gaps 42 having a trapezoidal shape, and the intervals between the slits are set narrower than the adjacent teen intervals (teeth pitches) of the stator 1. Thus, the spatial harmonic 61 can be effectively blocked. In other words, the spatial harmonic can be blocked by arranging the permanent magnets arranged on the outer periphery side of the rotor 3, or the non-magnetic bodies (the air gaps 31, the air gaps 42, and the slits 51a to 51d in the embodiment) such as the air gaps in the following manner.

The distance between each permanent magnet and each non-magnetic body portion, the distance between each permanent magnet and each slit portion, the distance between each slit portion and each air gap, and the distance Xn (in this case, Xn represents the n-th distance and an example in which the largest number of n is 6 is shown in the drawing) between the slits are set smaller (Xn<Y) than the interval Y (Y is used because the intervals between the teeth are constant) between the teeth 4 of the stator 1. With such a configuration, the spatial harmonic of the armature magnetic flux always passes through the permanent magnets or the non-magnetic bodies. Thus, the spatial harmonic can be reliably blocked and suppressed.

Figure 6A:
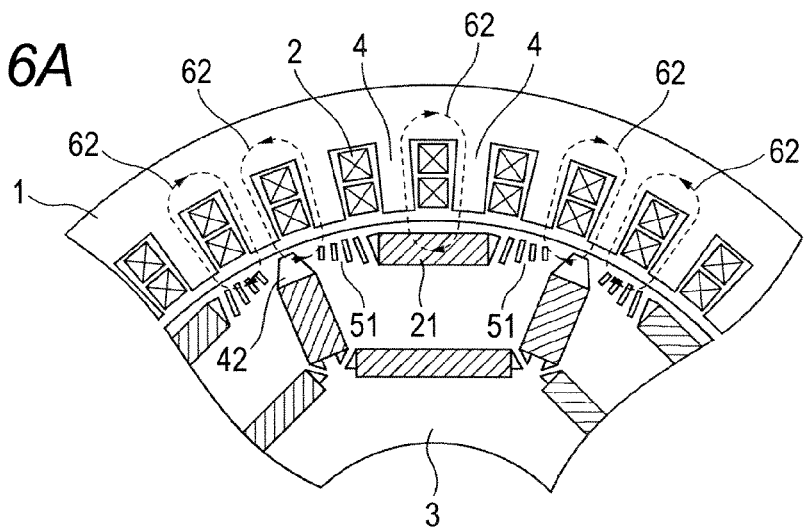
FIG. 6 are diagrams each showing a positional relation between the rotor and teeth of a stator at an arbitrary angle in the embodiment of the present invention.
Figure 6B:
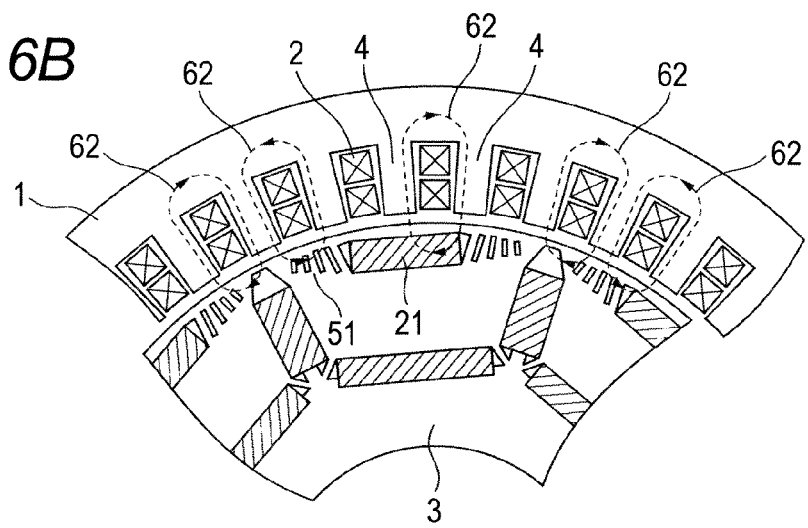
Figure 6C:
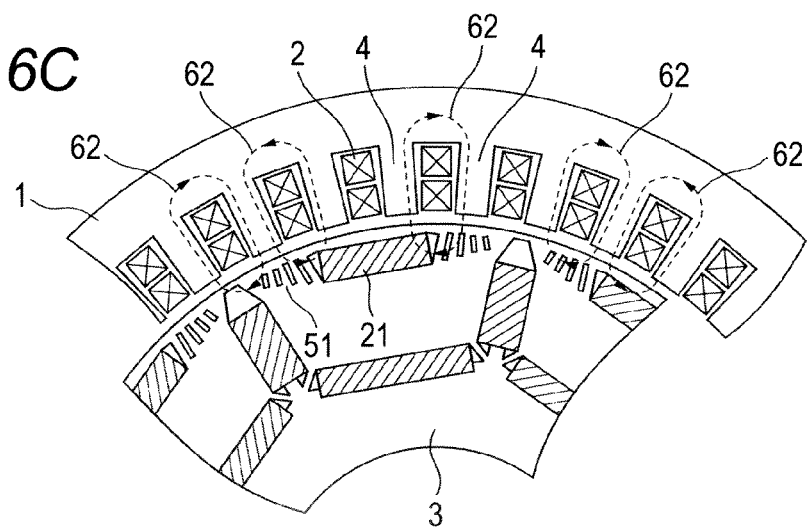

FIGS. 6(*a*) to (*c*) show positional relations between the rotor 3 and the teeth 4 of the stator at an arbitrary angle. As described above, the interval Xn is set narrower than, at least, the interval Y between the teeth. Accordingly, if the positional relations between the teeth of the stator and the rotor are changed during the operation, the spatial harmonic can be blocked at any position on the magnetic path of the spatial harmonic because the permanent magnets 21, the slit groups 51, and the air gaps 42 having a trapezoidal shape are present.

Specifically, the permanent magnets 21, the air gaps 42, and the slit groups 51 are arranged in order in the circumferential direction on the outer periphery side of the rotor, and realize the effect of suppressing the spatial harmonic that does not contribute to the torque and that is generated around the armature windings. The permanent magnet portions, the air gap portions, and the slit portions (slit groups) function as the magnetic flux blocking portions, and extend in the circumferential direction, so that unnecessary magnetic flux is cut. As shown by dotted lines 62 in FIGS. 6(*a*) to (*c*), it is apparent that the spatial harmonic is effectively blocked irrespective of the rotational position of the rotor 3.

Figure 7:
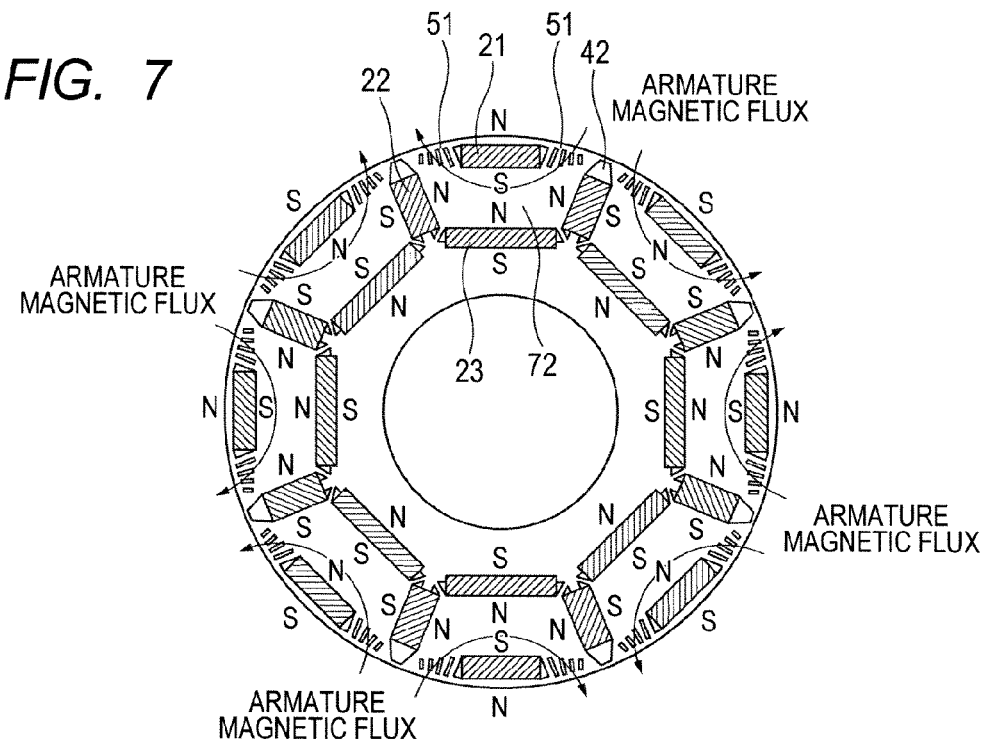
FIG. 7 is a diagram for showing the flow of magnetic flux of armature windings in the entire rotor.

The flow of the armature magnetic flux in the rotor of the electric machine will be described using FIG. 7. FIG. 7 is a diagram for showing the flow (arrows of solid lines) of the armature magnetic flux in the entire rotor 3 in the embodiment. The inflow and outflow in the d-axis directions of the armature magnetic flux generated from the armature windings 2 of the stator 1 are blocked by the permanent magnets 21. On the other hand, the armature magnetic flux in the q-axis directions is divided by the air gaps 42 having a trapezoidal shape and the permanent magnets 22 to flow in the rotor 3. Specifically, the armature magnetic flux flows in from the outer periphery side of the slit group 51, passes through the iron core portion 72 having a large area sandwiched between the permanent magnet 21 and the permanent magnet 23, and flows out from the outer periphery side of the other slit group 51. As described above, the armature magnetic flux is allowed to flow in while being divided. Accordingly, the armature magnetic flux passing through the iron core portion 72 having a large area sandwiched between the permanent magnet 21 and the permanent magnet 23 can be increased without magnetic saturation. In addition, the magnetoresistance can be reduced, and the reluctance torque can be increased.

Figure 8:
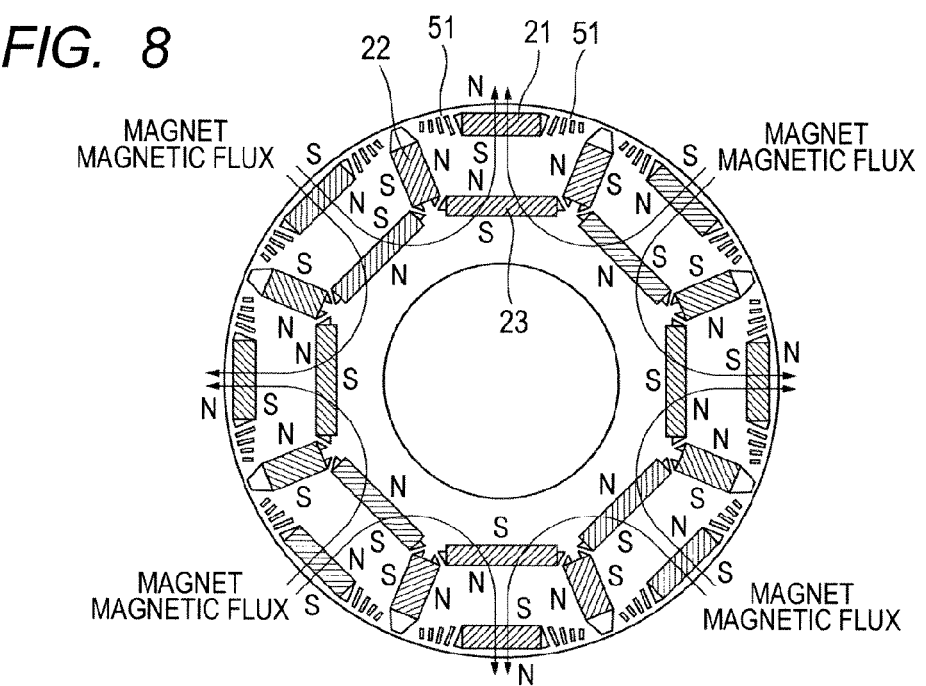
FIG. 8 is a diagram for showing the flow of magnet magnetic flux of permanent magnets in the entire rotor.

Next, the magnetic flux of the permanent magnets will be described. FIG. 8 is a diagram for showing the flow of the magnet magnetic flux of the permanent magnets. The magnetization direction of each permanent magnet 21 positioned on the outer periphery side on the d-axis is arranged to face the armature magnetic flux, so that the gap of magnetic density is enlarged and the saliency is increased. Thus, the reluctance torque can be increased. Further, the magnetic poles of the permanent magnets 22 and 23 are allowed to face each other, and thus the magnet magnetic flux is converged. Accordingly, the magnet torque can be increased.

Figure 9:
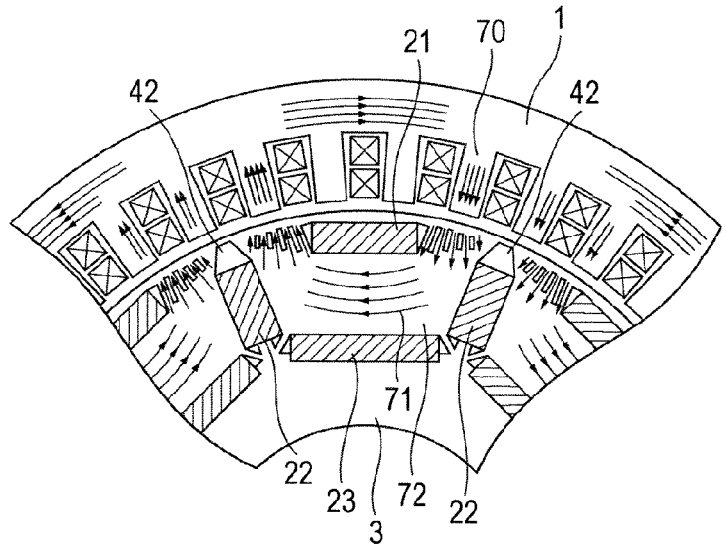
FIG. 9 is a diagram for showing the distribution of magnetic flux by an electromagnetic analysis according to the embodiment of the present invention.

FIG. 9 is a diagram for showing the distribution of magnetic flux by an electromagnetic analysis of the embodiment, and is a conceptual diagram for explaining the effect of the above-described slit groups 51. In order to realize a high output by actively using the reluctance torque, the slit groups 51 are provided in the embodiment as described above (see FIG. 1 to FIG. 2). It can be confirmed that each of the slit groups 51 has the effect of a rectifying unit (guiding unit) that rectifies and guides the flow of the magnetic flux that flows in or out between the rotor 3 and the stator 1.

In general, the magnetic flux is concentrated on the inner periphery side to form a short loop, and thus the magnetic saturation trend at the iron core portion on the inner periphery side is generally enhanced. The slit intervals on the inner periphery side are wider than those on the outer periphery side in the embodiment, so that the magnetic flux is rectified to the flow diffused in the entire iron core portion 72 sandwiched between the permanent magnet 21 and the permanent magnet 23 by the slit group 51. When the magnetic flux flows in the rotor 3 from the stator 1, the magnetic flux is divided by the air gaps 42 having a trapezoidal shape and the permanent magnets 22. Each divided magnetic flux 70 passes through the slit group 51, and is radially expanded to be diffused in the entire iron core portion 72 that is widely formed in the rotor 3. Accordingly, the magnetic saturation trend can be suppressed at the iron core portion 72, and the magnetoresistance can be advantageously reduced as the entire rotor. The magnetic flux 71 diffused by the slit group 51 passes through the other slit group 51 and flows out from the rotor. However, the magnetic flux diffused when passing through one slit group 51 is rectified and aggregated by the other slit group 51. Thus, the saliency is not deteriorated.

As shown in FIG. 9, while the distance B between the permanent magnet 21 and the permanent magnet 23 is large and the iron core portion 72 serving as the flow path of the magnetic flux is widely formed, the inflow and outflow side of the magnetic flux, namely, the distance A between an end of the permanent magnet 21 and the air gap 42 having a trapezoidal shape is shorter than the distance B between the permanent magnet 21 and the permanent magnet 23. Thus, when the magnetic flux flows in, the magnetic flux flows from a narrow portion to a wide portion of the slit group 51 to be diffused. When the magnetic flux flows out, the magnetic flux is aggregated. Accordingly, the flow of the magnetic flux can be effectively rectified (regarding the distance A and the distance B, see FIG. 2). Further, in addition to the above, the flow of the magnetic flux can be more effectively rectified by the rectifying effect of the magnetic flux by the slit group 51.

As the verification of the rectifying effect of the magnetic flux, an electromagnetic analysis was made for three examples. The structures and results of each example will be described below.

Figure 10A:
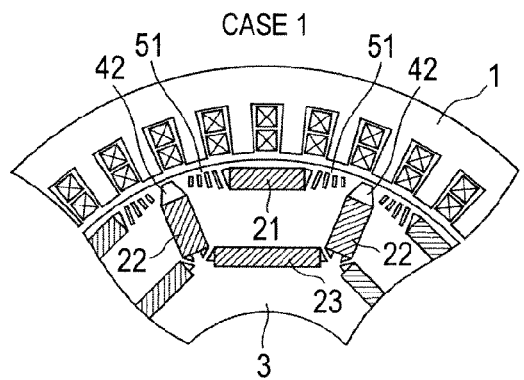
FIG. 10 are diagrams for showing examples of models to be compared and studied by the electromagnetic analysis.
Figure 10B:
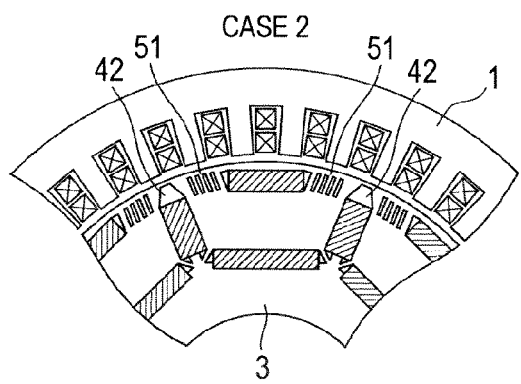
Figure 10C:
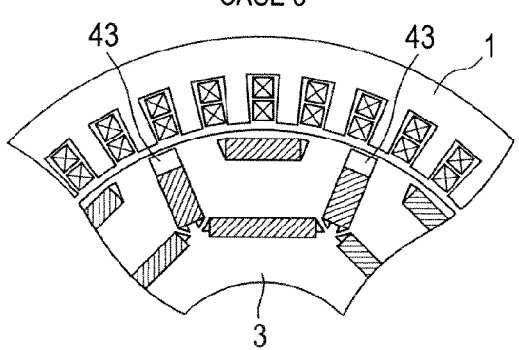

FIG. 10 are diagrams each showing an example of a model to be compared and studied by the electromagnetic analysis. A case 1 of FIG. 10(*a*) shows the above-described structure of the embodiment. A case 2 of FIG. 10(*b*) shows an example in which the all slits formed between the permanent magnet 21 and the air gaps 42 having a trapezoidal shape are formed parallel to the q-axis, and the lengths thereof in the radial direction are the same. A case 3 of FIG. 10(*c*) shows a comparison example in which no slit groups 51 are provided and air gaps 43 on the outer periphery side of the permanent magnets 22 are formed in a rectangular shape.

FIG. 11(a) shows a determination table of average output torque and torque pulsation by the electromagnetic analysis in each case of FIG. 10, and FIGS. 11(b) to (d) show torque waveforms thereof. The average output torque was sufficiently obtained in the case 1 and the case 2. However, the average output torque in the case 3 was decreased by about 5% as compared to the case 1 or the case 2.

The torque pulsation in the case 1 is about 5% which is the most excellent, and that in the case 2 is 10% or less. The torque pulsation in the case 3 is 20% or more. In consideration of the fact that the torque pulsation is generally about 20% in the reluctance-type rotating electric machine using the reluctance torque, it is apparent that the slit groups 51 and the air gaps 42 having a trapezoidal shape formed in the case 1 and the case 2 are considerably effective.

As described above, the permanent magnets 21, the slit groups 51, and the air gaps 42 having a trapezoidal shape are provided to contribute to the suppression of the spatial harmonic, and the magnetic flux flowing in the circumferential direction can be effectively cut by the configurations (see FIG. 4 to FIG. 6). On the other hand, the shape of intending to rectify the magnetic flux flowing into the rotor iron core is effective (see FIG. 8 to FIG. 10), and thus the respective slits of the embodiment are desirably configured as follows.

(1) Stretch long in the direction along the radial direction
(2) Arrange to be expanded from the outer periphery side of the rotor toward the inner periphery side In the structure of (1), a significant contribution to the rectifying effect of the magnetic flux can be confirmed (see the case 1 and the case 2 of FIG. 10 and FIG. 11), and the effect of reducing the torque pulsation can be sufficiently obtained. Further, by arranging the slits as in (2), the torque pulsation can be further reduced (see the case 1 of FIG. 10 and FIG. 11), and a more preferred configuration can be realized.

The followings are summarized advantages of the structure in the embodiment. High torque using the permanent magnets having a low residual magnetic flux density can be realized by effectively using both of the reluctance torque generated from the armature current and the magnet torque from the permanent magnets having a low residual magnetic flux density such as ferrite magnets.

Specifically, the permanent magnets are buried on the outer periphery side on the d-axes, the permanent magnets are formed on the q-axes, the air gaps having a trapezoidal shape are formed at the ends on the outer periphery side thereof, the slit groups are formed between the permanent magnets on the outer periphery side on the d-axes and the air gaps having a trapezoidal shape, and the intervals in the circumferential direction are arranged narrower than the distances between the adjacent teeth of the stator. Accordingly, the spatial harmonic of the armature magnetic flux that does not contribute to the output torque can be blocked, and the magnetic saturation in the iron core portions of the stator and the rotor can be suppressed. Namely, the amount of magnetic flux contributing to the output torque can be amplified, and thus the output torque can be increased.

Further, the magnetic flux is divided by the permanent magnets on the q-axes and the air gaps having a trapezoidal shape, and thus the magnetic saturation in the iron core portion of the rotor can be eased. Namely, the amount of magnetic flux contributing to the output torque can be amplified, and thus the output torque can be increased, as similar to the above.

Further, the slit groups that are expanded from the outer periphery side of the rotor to the inner periphery side and that are shortened in length from the d-axis toward the q-axis at a constant rate are provided, so that the torque pulsation increased when using the reluctance torque can be significantly suppressed.

Second Embodiment

Figure 12:
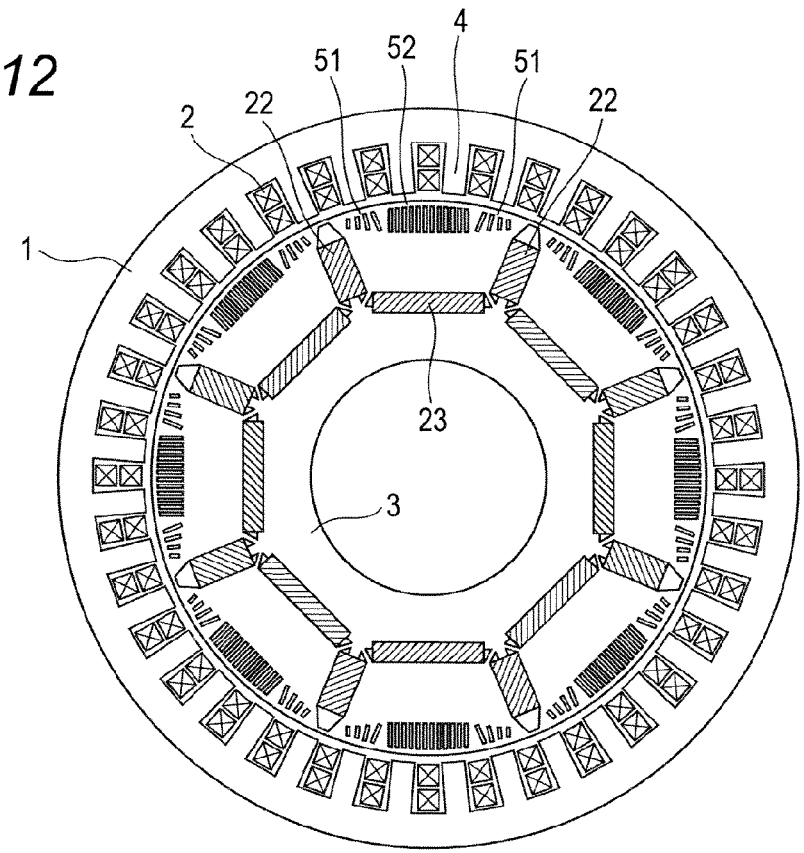
FIG. 12 is a cross-sectional view of a composite torque rotating electric machine in the radial direction according to a second embodiment of the present invention.
Figure 13:
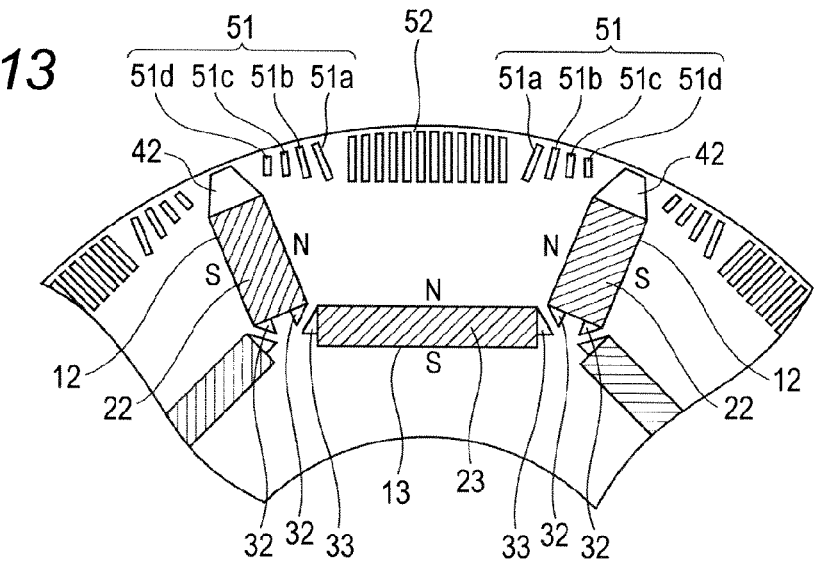
FIG. 13 is an enlarged view of main parts of a rotor structure according to the second embodiment of the present invention.

Next, an example different from the embodiment will be described. FIG. 12 is a cross-sectional view of a composite torque rotating electric machine in the radial direction according to a second embodiment of the present invention, and FIG. 13 is an enlarged view of main parts. The composite torque rotating electric machine shown in each of FIG. 12 and FIG. 13 is configured using a stator 1 having octal armature windings and a cylindrical rotor 3. An iron core of the rotor 3 of the structure in the embodiment is configured using laminated circular magnetic steel sheets, and three or more permanent magnets are buried in one magnetic pole. Instead of the permanent magnets 21 of the first embodiment, slit groups 52 are provided.

Each of permanent magnets 22 is buried in an air gap 12 having a rectangular shape on a q-axis, and is fixed by adhesive material or rubber made of resin. Air gaps 42 having a trapezoidal shape are formed at ends on the outer periphery side of the permanent magnets 22. Air gaps 32 having nearly a triangular shape or nearly a trapezoidal shape are provided at ends on the inner periphery side.

Each of permanent magnets 23 is buried in an air gap 13 having a rectangular shape on the inner periphery side on a d-axis, and is fixed by adhesive material or rubber made of resin. Each of the permanent magnets 23 is magnetized in the direction parallel to the d-axis. In the case where the surface of each permanent magnet 22 facing the d-axis corresponds to the north pole, each permanent magnet 23 is arranged in such a manner that the surface on the outer periphery side corresponds to the north pole. In the case where the surface of each permanent magnet 22 facing the d-axis corresponds to the south pole, each permanent magnet 23 is arranged in such a manner that the surface on the outer periphery side corresponds to the south pole.

Slit groups 51 of plural slits are formed at iron core portions between the slit groups 52 and the air gaps 42 having a trapezoidal shape positioned on the outer periphery side of the permanent magnets 22. In the second embodiment, four slits are shown as similar to the first embodiment. However, it is apparent that the number of slits is not limited to four.

A slit 51a nearest to the slit group 52 is formed to be parallel to the q-axis (adjacent q-axis), and a slit 51d nearest to the q-axis is formed to be parallel to the d-axis. Slits 51b and 51c have nearly equal angles obtained by dividing an angle having an intersection point as the center between the central axis of the slit 51a and the central axis of the slit 51d (see FIG. 3). The lengths of the respective slits in the slit groups 51 are shortened from the d-axis side toward the q-axis side at a constant rate. The position in the circumferential direction of each slit group 51 is formed substantially in the middle between the slit group 52 and the trapezoidal air gap 42. Non-magnetic bodies such as air and resin are enclosed in the inside of each slit.

Each of the slit groups 52 formed on the outer diameter side on the d-axes is configured using plural parallel slits, configures a magnetic blocking unit as similar to the permanent magnets 21 of the first embodiment, functions to block spatial harmonics 61 of armature magnetic flux generated from armature windings 2 of the stator 1, and the same effect similar to the structure shown in the first embodiment can be obtained.

LIST OF REFERENCE SIGNS

1: stator, 2: armature winding, 3: rotor, 4: teeth, 11: permanent magnet insertion air gap portion, 12: permanent magnet insertion air gap portion, 13: permanent magnet insertion air gap portion, 21: first permanent magnet, 21, 42, 51, 52: magnetic blocking unit, 22: third permanent magnet, 23: second permanent magnet, 31, 32, 33: air gap, 42: air gap having trapezoidal shape, 51: first slit, 51$d$: second slit, 52: slit group, 61: spatial harmonic of armature magnetic flux, 62: blocked spatial harmonic of armature magnetic flux, 72: iron core portion, A: distance in circumferential direction between first permanent magnet and air gap portion, B: distance in radial direction between first permanent magnet and second permanent magnet Xn: distance between permanent magnet and non-magnetic body portion, distance between permanent magnet and slit portion, distance between slit portion and air gap, distance between slits, Y: teeth interval (distance between teeth)

The invention claimed is:

1. A composite torque rotating electric machine comprising:
   a stator in which armature windings are arranged at plural areas in the circumferential direction at regular intervals;
   a rotor that is configured using a cylindrical iron core obtained by laminating magnetic steel sheets;
   plural first permanent magnets that are provided on d-axes and that are arranged in the circumferential direction on the outer periphery of the rotor;
   plural second permanent magnets that are provided on the d-axes and that are arranged on the inner periphery side of the rotor to face the first permanent magnets on the outer periphery side;
   third permanent magnets that are provided on q-axes and that are stretched longitudinally in the radial direction in the rotor; and
   air gap portions that are provided at a middle position between the plural first permanent magnets along the circumferential direction on the outer periphery side of the third permanent magnets, wherein
   the distances in the radial direction between the first permanent magnets and the second permanent magnets are larger than the distances in the circumferential direction between the first permanent magnets and the air gap portions, and rectifying units configured using plural slits are provided between the first permanent magnets and the air gap portions,
   a slit nearest the first permanent magnet has a greatest length of the plural slits, and
   only one second permanent magnet is provided between two adjacent third permanent magnets.

2. The composite torque rotating electric machine according to claim 1, wherein the intervals between the plural slits are longer on the inner periphery side than those on the outer periphery side.

3. The composite torque rotating electric machine according to claim 2, wherein a first slit of the plural slits near the first permanent magnet is parallel to the q-axis, and a second slit nearest to the q-axis is parallel to the d-axis.

4. The composite torque rotating electric machine according to claim 3, wherein slits provided between the first slit and the second slit are evenly positioned with respect to an intersection point of the central axis in the longitudinal direction of the first slit and the central axis in the longitudinal direction of the second slit.

5. The composite torque rotating electric machine according to claim 1, wherein non-magnetic bodies are enclosed in the inside of the plural slits.

6. The composite torque rotating electric machine according to claim 1, wherein the plural slits are arranged expanding toward the center of the rotor.

7. The composite torque rotating electric machine according to claim 6, wherein slits provided between the first slit and the second slit are divided into equal angles at an intersection point as the center between the central axis in the longitudinal direction of the first slit and the central axis in the longitudinal direction of the second slit.

8. The composite torque rotating electric machine according to claim 1, wherein the plural slits are extended in the radial direction along the magnetic flux passing between the q-axis and the d-axis.

* * * * *